(12) United States Patent
Moro et al.

(10) Patent No.: US 10,093,190 B2
(45) Date of Patent: Oct. 9, 2018

(54) CHARGING CONTROL DEVICE

(71) Applicant: MITSUBISHI JIDOSHA KOGYO KABUSHIKI KAISHA, Tokyo (JP)

(72) Inventors: Kosuke Moro, Yokohama (JP); Norihiko Hatsumi, Anjo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 338 days.

(21) Appl. No.: 15/144,086

(22) Filed: May 2, 2016

(65) Prior Publication Data

US 2016/0243954 A1  Aug. 25, 2016

Related U.S. Application Data

(63) Continuation of application No. PCT/JP2014/073810, filed on Sep. 9, 2014.

(30) Foreign Application Priority Data

Nov. 11, 2013  (JP) .................................. 2013-233170

(51) Int. Cl.
*H02J 7/00* (2006.01)
*B60L 11/18* (2006.01)
(Continued)

(52) U.S. Cl.
CPC ......... *B60L 11/1816* (2013.01); *B60L 3/0023* (2013.01); *B60L 3/04* (2013.01); *B60L 11/1803* (2013.01); *B60L 11/185* (2013.01); *B60L 11/1824* (2013.01); *B60L 11/1861* (2013.01); *B60L 11/1866* (2013.01); *B60L 15/2009* (2013.01); *H02H 7/18* (2013.01); *B60L 2240/12* (2013.01); *B60L 2240/421* (2013.01); *B60L 2240/423* (2013.01); *B60L 2240/545* (2013.01); *B60L 2240/547* (2013.01); *B60L 2240/549* (2013.01); *B60L 2240/80* (2013.01);
(Continued)

(58) Field of Classification Search
USPC ......................................................... 320/109
See application file for complete search history.

(56) References Cited

U.S. PATENT DOCUMENTS

2015/0375621 A1* 12/2015 Ono ........................ B60L 1/003
307/10.1

FOREIGN PATENT DOCUMENTS

JP      7-192802 A    7/1995
JP   2009-136110 A    6/2009
(Continued)

OTHER PUBLICATIONS

Office Action dated May 17, 2017 issued in corresponding Japanese Patent Application No. 2013-233170 with an English Translation.

*Primary Examiner* — Robert Grant
(74) *Attorney, Agent, or Firm* — Birch, Stewart, Kolasch & Birch, LLP

(57) ABSTRACT

There is provided a voltage-between-terminals measurement unit that measures voltage between the terminals of a charging connector connecting an external charger that charges a battery. A release device of the charging connector determines melt of charging contactors, and disconnects main contactors to immediately reduce the voltage between the terminals of the charging connector if it is determined that the charging contactors melt.

20 Claims, 11 Drawing Sheets

(51) Int. Cl.
*H02H 7/18* (2006.01)
*B60L 3/00* (2006.01)
*B60L 3/04* (2006.01)
*B60L 15/20* (2006.01)

(52) U.S. Cl.
CPC ....... *B60L 2250/10* (2013.01); *B60L 2250/16* (2013.01); *B60L 2250/26* (2013.01); *Y02T 10/645* (2013.01); *Y02T 10/7005* (2013.01); *Y02T 10/7044* (2013.01); *Y02T 10/7061* (2013.01); *Y02T 10/7072* (2013.01); *Y02T 10/72* (2013.01); *Y02T 10/7275* (2013.01); *Y02T 90/121* (2013.01); *Y02T 90/128* (2013.01); *Y02T 90/14* (2013.01)

(56) References Cited

FOREIGN PATENT DOCUMENTS

| | | |
|---|---|---|
| JP | 2012-77514 A | 4/2012 |
| JP | 2013-20732 A | 1/2013 |
| JP | 2013-145735 A | 7/2013 |
| JP | 2013-225996 A | 10/2013 |

* cited by examiner

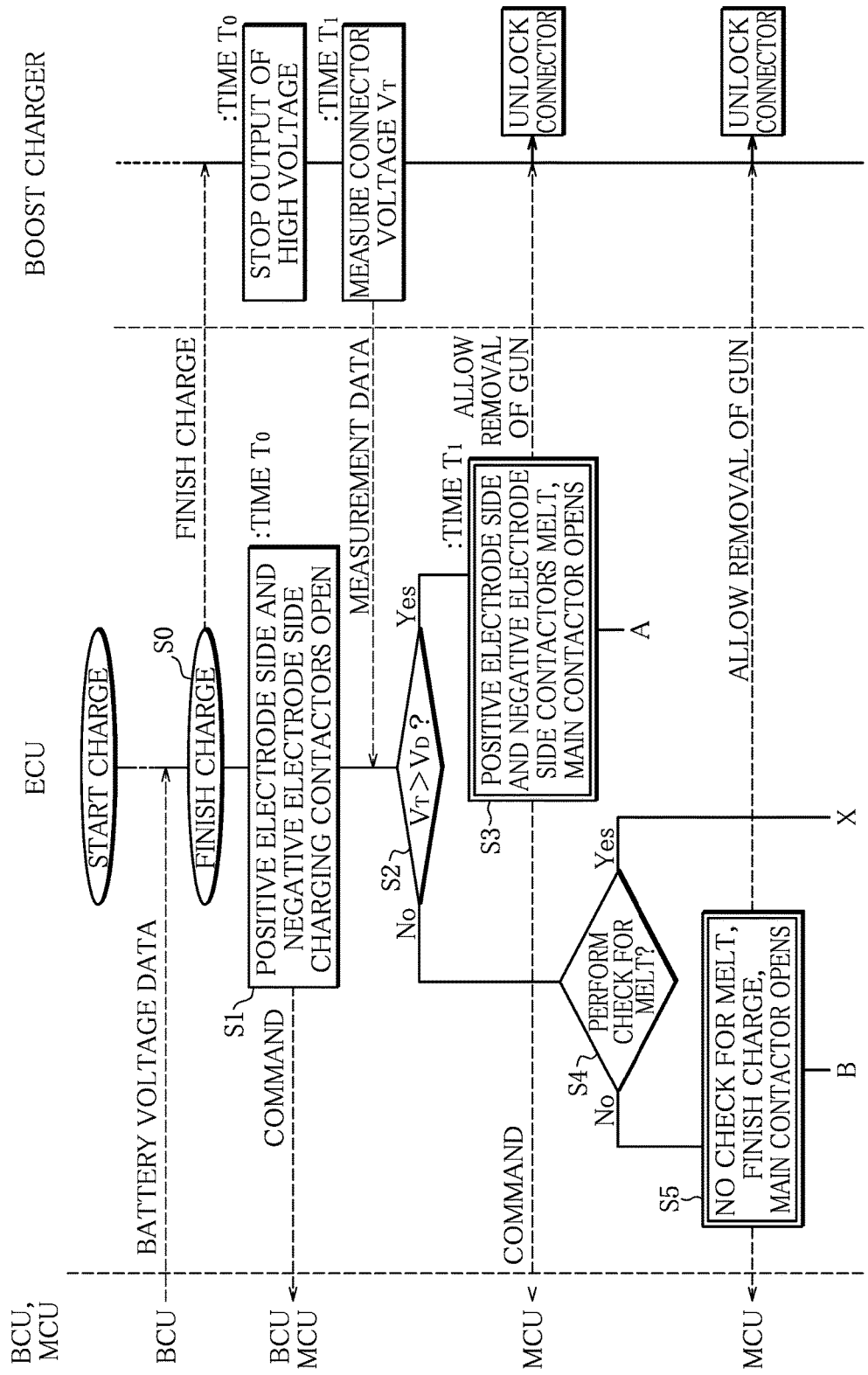

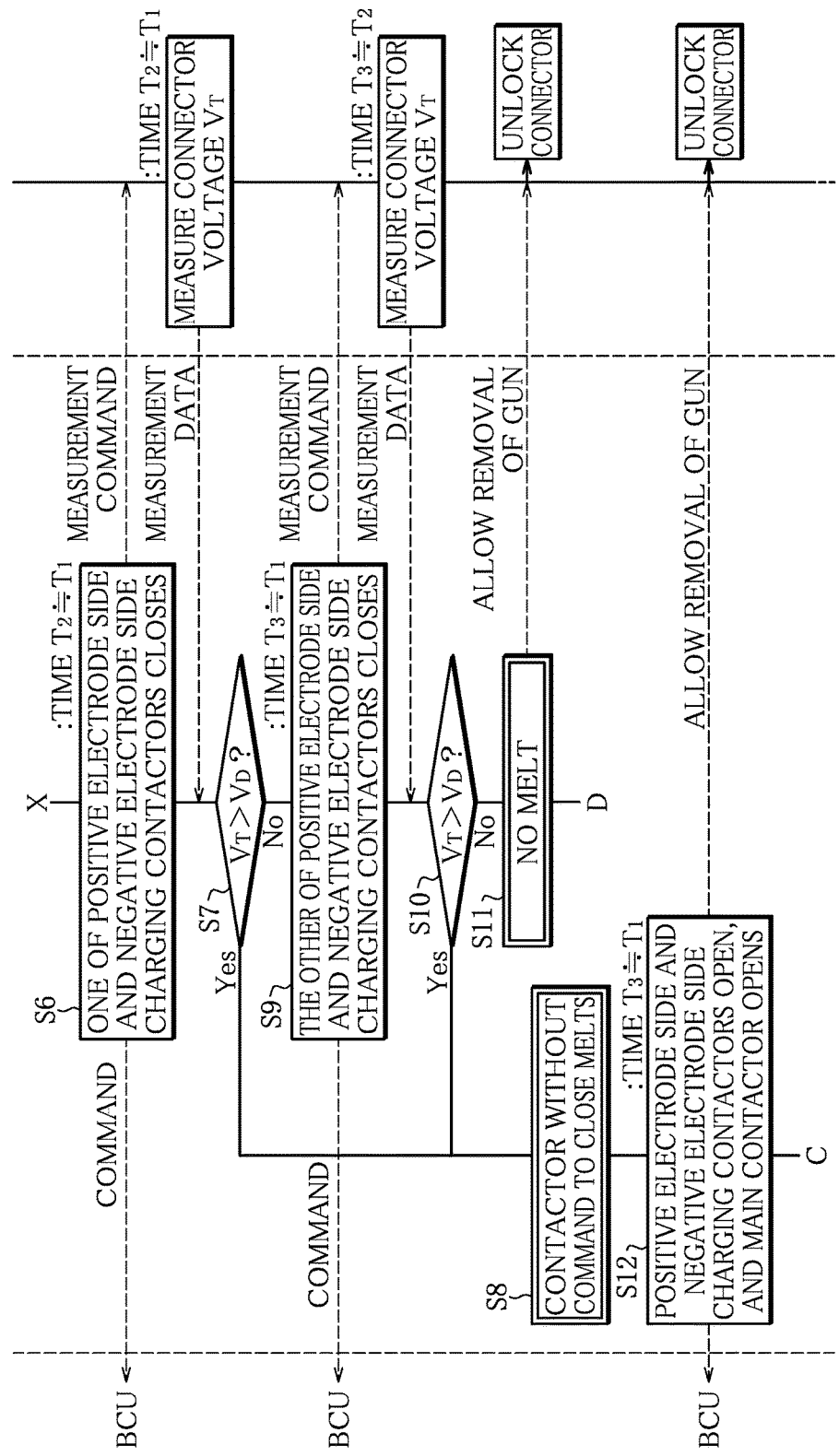

CHARGING CONTROL DEVICE

CROSS REFERENCE TO RELATED APPLICATIONS

This application is a Continuation of PCT International Application No. PCT/JP2014/073810, filed on Sep. 9, 2014, which claims priority under 35 U.S.C. 119(a) to Patent Application No. JP 2013-233170, filed in Japan on Nov. 11, 2013, all of which are hereby expressly incorporated by reference into the present application.

BACKGROUND OF THE INVENTION

Filed of the Invention

The present invention relates to a charging control device, and more particularly to a charging control device used for charging a battery of a plug-in hybrid car or an electric car.

Description of the Related Art

A charger that charges a high voltage battery for driving, mounded in an electric vehicle with an external charging function, such as a plug-in hybrid car (PHEV) or an electric car (EV), has used a method (normal charging method) of charging the high voltage battery by using an external power source of AC 100/200 V to generate direct current of high voltage with an AC/DC converter or the like in the electric vehicle.

Unfortunately, in the method, it takes about 7 hours by using an external power source of AC 200 V, or about 14 hours by using that of AC 100 V to fully charge the high voltage battery.

To solve this disadvantage of the normal charging method in which a charging time is long, a boost charger for charging a high voltage battery in a short time has been provided.

The boost charger uses a method of charging a high voltage battery by directly supplying direct current at a high voltage of DC 300 V or more and with large electric power to the high voltage battery from an external power source. The boost charger applies a direct current at 300 V or more to a connector socket for boost charging provided in an electric vehicle, and to a terminal of a connector plug (charging gun) of an external power source, inserted into the connector socket.

In this way, the boost charging of a high voltage battery using an external power source applies higher voltage than that in the normal charging method to the connector plug or the connector socket, for charging, and thus electric current with large electric power tends to flow in the case of short-circuiting or getting an electrical shock. Thus, a more sufficient safety measure is required as compared with the normal charging method. For example, if a charging contactor provided in a charging circuit in an electric vehicle melts, the connector may receive output voltage of the high voltage battery after being removed, depending on a state of the circuit.

For that, when high voltage is applied to a terminal of a charging connector, for example, a connector plug (gun) of a charger is locked to be prevented from being removed (refer to Japanese Patent Laid-Open No. 2013-020732, for example).

Although a conventional electric vehicle determines melting of a charging contactor after charging is finished, the charging contactor is controlled to open when it is determined that there is no melt to allow a charging connector to be removed.

A conventional electric vehicle cannot allow a charging contactor to open even after charging is finished if the charging contactor melts, and thus high voltage remains applied to a charging connector so that the charging connector cannot be removed. Thus, when being moved by a wrecker or the like, for example, the electric vehicle has to be towed away while the charging connector remains connected. As a result, there is a problem in that an external charger may be disassembled to be unable to be used.

SUMMARY OF THE INVENTION

The present invention is made to solve this kind of problem, and it is an object of the present invention to provide a charging control device that is formed simply to determine melting of a charging contactor on each of a positive electrode side and a negative electrode side provided in a battery charging DC line, and that allows a charging connector to be removed even if it is determined that there is melt.

The present invention is a charging control device that includes: a battery for driving an electric vehicle; a driving DC line on each of a positive electrode side and a negative electrode side, through which electric power of the battery is supplied to an inverter; a main contactor on each of the positive electrode side and the negative electrode side that is provided in the driving DC line between the battery and the inverter to disconnect or connect the driving DC line; a charging connector that is connected to a power supply connector through which electric power is supplied to the battery from an external power source; a charging DC line on each of the positive electrode side and the negative electrode side that branches from the driving DC line on each of the positive electrode side and the negative electrode side, between the main contactor and the inverter, and that is connected to the charging connector; a charging contactor on each of the positive electrode side and the negative electrode side that is provided in the corresponding charging DC line on each of the positive electrode side and the negative electrode side to disconnect or connect the charging DC line; a control unit that controls the main contactor and the charging contactor; a voltage-between-terminals measurement unit that measures voltage between the charging DC lines on the positive electrode side and the negative electrode side, or voltage between terminals of the charging connector; a connector locking unit that locks connection between the charging connector and the power supply connector if the voltage between the terminals is more than a threshold voltage; and a melting determination section that determines whether the charging contactor melts on the basis of whether the voltage between the terminals is more than the threshold voltage, wherein the control unit disconnects the main contactor if the melting determination section determines that the charging contactor melts.

The charging control device of the present invention disconnects the main contactor if it is determined that the charging contactor melts, and thus the power supply connector can be removed even if the charging contactor melts. In addition, the charging connector is prevented from receiving high voltage after the power supply connector is removed, and thus safety of an operator (a driver or an external charger operator) can be increased.

BRIEF DESCRIPTION OF THE DRAWINGS

FIG. 7A is a diagram showing the first half of an outline of an operation flow of the charging control device in accordance with the present invention in the embodiment 1.

FIG. 7B is a diagram showing the second half of an outline of an operation flow of the charging control device in accordance with the present invention in the embodiment 1.

DETAILED DESCRIPTION OF THE PREFERRED EMBODIMENTS

Embodiments of the present invention will be described below with reference to FIGS. 1 to 12. A charging control device in accordance with the present invention is also applicable to a battery other than a high voltage battery. In descriptions below, a "battery" includes a high voltage battery.

Figure 1:
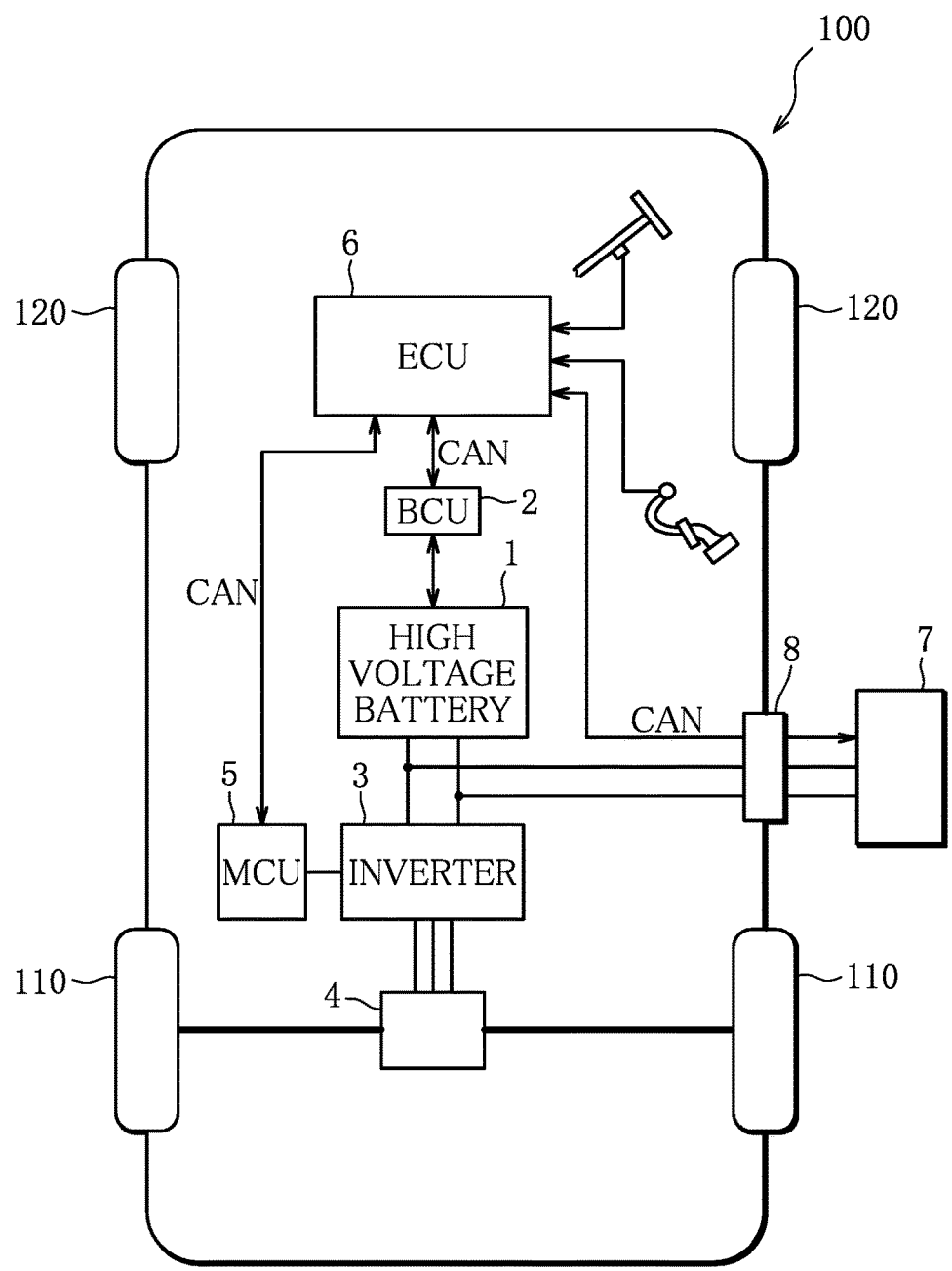
FIG. 1 is a schematic structural view of an example of an electric vehicle with a charging function, to which a charging control device in accordance with the present invention is applied.

FIG. 1 is a schematic structural view of an example of an electric vehicle with a charging function, to which the charging control device in accordance with the present invention is applied.

As shown in FIG. 1, a vehicle 100 to which the present invention is applied includes a battery 1, a battery control unit (BCU) 2, an inverter 3, a motor generator (MG) 4, a motor control unit (MCU) 5 that controls the inverter 3, and an electronically controlling unit (ECU) 6 that controls the entire vehicle. The vehicle 100 is an electric vehicle or an electric car that travels by using the motor 4 that drives driving wheels 110 provided on both sides of the vehicle 100. The motor generator 4 operates as a generator when the vehicle decelerates.

The battery 1 is provided with a plurality of battery modules (not shown) each of which includes a plurality of secondary batteries such as lithium-ion batteries. In addition, a cell control unit (CCU, not shown) that monitors a state of charge and discharge of a battery cell (State Of Charge, hereinafter referred to as SOC), temperature, and the like, and that allows balancing discharge to be applied to the battery cells if necessary, is provided in every battery module, for example. Further, the battery control unit (BCU) 2 is configured to monitor and control temperature, a state of charge and discharge, and the like, of the battery 1 on the basis of an output signal from the cell control unit.

The inverter 3 supplies three-phase drive electric power to the motor generator 4, for example, to control rotation of the motor generator 4. Rotation output of the motor generator 4 is transmitted to the driving wheels 110 to the vehicle 100 to drive the vehicle 100. When the vehicle decelerates, the motor generator 4 operates as a generator (regenerative operation), and then three-phase AC power from the motor generator 4 is converted into direct current by the inverter 3 to be stored in the battery 1.

The motor control unit (MCU) 5 controls the inverter 3 to control rotational driving and regenerative operation of the motor generator. That is, the motor control unit 5 controls rotation output of the motor generator 4 by controlling the inverter 3 on the basis of a control signal of a torque command from the electronically controlling unit ECU, or a regenerative command, to supply three-phase AC power to the motor generator 4. Even at the time of regeneration, the motor control unit (MCU) 5 controls operation of the inverter 3 to convert three-phase AC power from the motor generator 4 into direct current to charge the battery 1.

The battery control unit (BCU) 2, the motor control unit (MCU) 5, and the electronically controlling unit (ECU) 6 communicate with each other through a CAN. The battery control unit 2 and the motor control unit 5 control the battery 1 and inverter 3, respectively, on the basis of a control signal transmitted from the ECU through the CAN.

The electric vehicle to which the present invention is applied enables the battery 1 to be charged by using not only regenerative electric power from the motor generator 4 as described above, but also electric power from an external charger.

Although some devices charge a battery by using an AC power source of 100 V/200 V and converting AC power of 100 V/200 V into direct current with a charger provided in an electric vehicle, even when an AC power source of 200 V is used, this kind of devices requires about 7 hours to charge the battery in a state of charge (SOC) of 0% up to a state of charge of 100%. For this reason, a charging function capable of directly charging a battery in about 30 minutes by using direct current with large electric power from the outside attracts attention, and thus charging stations for this function have been gradually provided.

FIG. 1 shows this kind of external charger (charging station) 7 and a charging connector 8. The connector 8 is composed of a connector socket (charging connector) 8a in an electric vehicle and a connector plug (so-called "gun", or power supply connector) 8b in the external charger 7 (refer to FIGS. 2 and 9). When a battery is charged, the connector plug 8b in the external charger 7 is fitted into the connector socket 8a in the electric vehicle.

Up to this point, while the so-called electric car (EV) is described as an example of an electric vehicle to which the present invention is applied, the present invention is also applicable to charging of a battery of a plug-in hybrid car (PHEV). While FIG. 1 shows the driving wheels 110 as rear wheels of the electric vehicle 100, the following vehicles are also available: a vehicle in which front wheels 120 are configured to be driving wheels; a vehicle in which both of the front wheels 120 and the rear wheels 110 are configured to be driven; and a vehicle in which four wheels are individually driven. Each of the vehicles configured as above may be provided with the corresponding number of motor generators.

Figure 2:
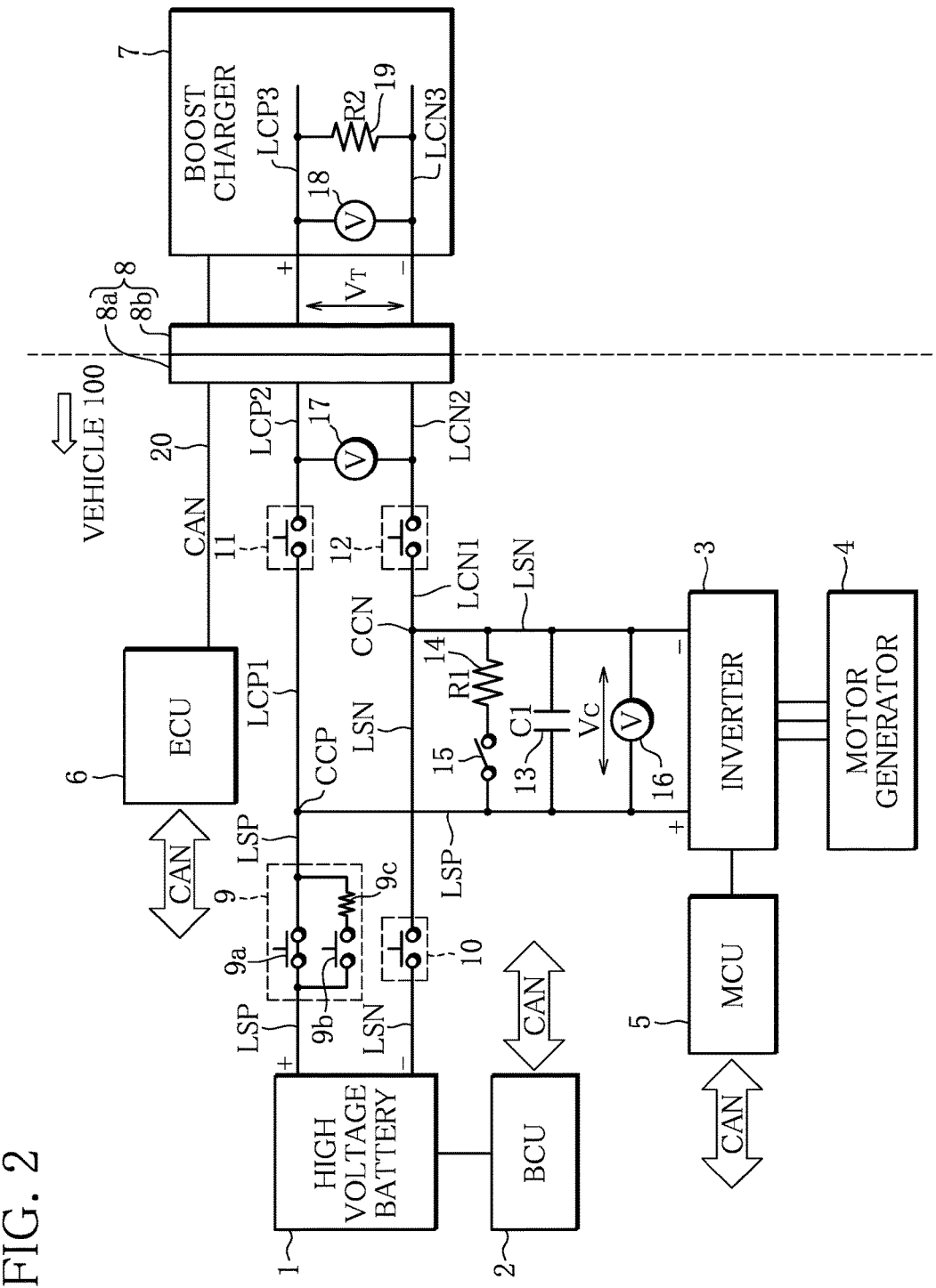
FIG. 2 is a diagram showing a vehicle side circuit in accordance with an embodiment 1 of the present invention used when the electric vehicle shown in FIG. 1 is charged, and an outline of a charger connected to the vehicle side circuit.

FIG. 2 shows an outline of an example of a configuration of a charging circuit (embodiment 1) in an electric vehicle to which the present invention is applied.

In FIG. 2, DC lines between the battery and the MCU/the inverter 3 are represented by driving DC lines LSP and LSN that are connected to positive electrode and negative electrode output terminals of the battery 1, respectively. For purpose of illustration, sections of charging DC lines to be connected to the driving DC lines LSP and LSN, closer to the battery than a positive electrode side contactor 11 and a negative electrode side contactor 12, for charging, are represented by LCP1 and LCN1, respectively, and those closer to the connector socket 8a than the positive electrode side contactor 11 and the negative electrode side contactor 12 are represented by LCP2 and LCN2, respectively. In addition, battery charging DC lines on an external charger side are represented by LCP3 and LCN3, respectively. The LCP1, LCP2, and LCP3 are called a positive electrode side charging DC line LCP as a whole, and the LCN1, LCN2, and LCN3 are called a negative electrode side charging DC line LCP, as a whole. The positive electrode side and negative electrode side charging DC lines LCP and LCN have connection points to the driving DC lines LSP and LSN that are represented by a positive electrode side connection point CCP, and a negative electrode side connection point CCN, respectively.

Embodiment 1

First, a configuration of an embodiment 1 will be described below to describe operation and a configuration of a melt checking device for a charging contactor, in accordance with the present invention.

A circuit of FIG. 2 will be first described in detail.

The circuit shown in FIG. 2 includes the driving DC lines (LSP and LSN) on the respective positive and negative electrode sides between the battery 1 and the inverter 3. Main contactors 9 and 10 on the respective positive and negative electrode sides are inserted in series to the DC lines LSP and LSN on the respective positive and negative electrode sides, respectively. The main contactors are closed when the motor generator 4 is rotationally driven, and then direct-current power is supplied to the inverter 3 from the battery 1. The inverter 3 converts the direct-current power into three-phase AC power to supply the three-phase AC power to the motor generator 4. The inverter 3 also closes the main contactors 9 and 10 at the time of converting power generated by the motor generator 4 when a vehicle decelerates into direct-current power to charge the battery 1.

A smoothing capacitor 13 is connected between the driving DC lines LSP and LSN at a position closer to the inverter than the main contactors 9 and 10 to reduce noise occurring in the inverter 3 and the motor generator 4 superimposed on the driving DC lines LSP and LSN. When a discharge switch 15 is closed, a discharge resistance 14 (called R1, and a resistance value is also indicated as R1) allows the smoothing capacitor 13 to discharge electric charges. The smoothing capacitor discharges electric charges after the main contactors 9 and 10 are disconnected to stop supply of direct-current power to the inverter from the battery 1 when a vehicle is stopped. A voltage measurement meter 16 measures voltage between the driving DC lines LSP and LSN at a position closer to the inverter than the main contactors 9 and 10, or voltage $V_C$ between the terminals of the smoothing capacitor 13.

The main contactor 9 includes one relay (main relay) 9a, and a series circuit of one relay (precharge relay) 9b and a resistance 9c, which are connected in parallel. When a vehicle starts operation, the precharge relay 9b of the main contactor 9 is first closed after the main contactor 10 is closed so that the smoothing capacitor 13 is charged. The resistance 9c restricts large current from the battery to prevent the relay from melting. After the smoothing capacitor 13 is charged, the main relay 9a is closed to allow the vehicle to become a normal operation state. In an example of FIG. 2, while the main contactors 9 and 10 are provided in the positive electrode side DC line LSP and the negative electrode side DC line LSN, respectively, a reverse configuration to this configuration is also available. That is, the main contactors 9 and 10 may be provided in the negative electrode side DC line LSN and the positive electrode side DC line LSP, respectively.

The battery charging DC lines (LCP and LCN) are composed of the DC lines (LCP1, LCP2, LCN1, and LCN2) on an electric vehicle 100 side, and the DC lines (LCP3 and LCN3) on an external charger side. The DC lines LCP1 and LCN1 are respectively connected to the driving DC lines LSP and LSN at the connection points CCP and CCN between the main contactors 9 and 10, and the inverter 3. The DC lines LCP2 and LCN2 connect the positive electrode side charging contactor 11 and the negative electrode side charging contactor 12, and the connector socket 8a for charging on the electric vehicle 100 side.

The DC lines LCP3 and LCN3 on the external charger side connect the connector plug (gun) 8b on an external charger 7 side and the external charger 7. That is, the battery charging DC lines LCP and LCN includes the DC lines LCP1, LCP2, LCN1, and LCN2 on a vehicle side, and the DC lines LCP3 and LCN3 on the external charger side, which are connected to each other by the connector 8 (connector socket 8a and connector plug 8b). The positive electrode side contactor 11 and the negative electrode side contactor 12, for charging, are used to disconnect or connect the battery charging DC lines LCP and LCN, respectively.

Each of the main contactors 9 and 10, and the charging contactors 11 and 12, uses a normally-off relay, and the discharge switch 15 uses a normally-off switch. The relay and switch include a MOSFET or mechanical relay and switch, for example. Thus, the contactors and switch are opened operation when a vehicle is stopped is finished to stop an operation power source thereof.

The voltage measurement meter (the voltage-between-terminals measurement unit) 17 measures voltage between the terminals of the connector socket 8a, or voltage between the DC lines LCP2 and LCN2, for charging.

On the external charger 7 side, a voltage measurement meter 18 is provided to measure voltage between the DC lines LCP3 and LCN3 on the external charger side. A resistance 19 (called R2, and a resistance value is also indicated as R2) is provided to immediately discharge electric charges remaining in stray capacitance of the DC lines LCP3 and LCN3 after DC output of the external charger is stopped when charging is finished to open the contactors 11 and 12 so that voltage between the DC lines LCP3 and LCN3, or voltage between the terminals of the connector plug 8b, is reduced to a specified value or less. For safety, if voltage between the terminals of the connector plug 8b is the specified value or more, the connector 8 is locked by the connector locking unit to prevent the connector plug 8b from being removed.

When the connector plug (gun) 8b of the external charger 7 is coupled to the connector socket 8a on the electric vehicle 100 side for charging, a signal line 20 is connected to allow the electronically controlling unit (ECU) 6 of the electric vehicle and a control unit (not shown) on the external charger side to communicate with each other through the CAN. When charging is performed, a signal indicating that preparation operation on the electric vehicle side is completed, and a signal indicating that an SOC of the battery becomes 100% and operation for finishing the charging is completed, are transmitted to the external charger side through the signal line. From the external charger 7 side, a signal indicating that output of direct-current power for charging is started, and data on voltage between the terminals of the external charger measured by the voltage measurement meter 18, are transmitted to the electronically controlling unit (ECU) 6 on the vehicle 100 side.

The motor control unit (MCU) 5 controls opening/closing of the main contactors 9 and 10 on the basis of a command from the electronically controlling unit (ECU) 6. Likewise, although the motor control unit 5 may control opening/closing of the charging contactors 11 and 12, a battery control unit (ECU) 2 may control the charging contactors 11 and 12 on the basis of a command from the electronically controlling unit (ECU) 6, or the electronically controlling unit 6 may directly control the charging contactors 11 and 12.

Figure 3:
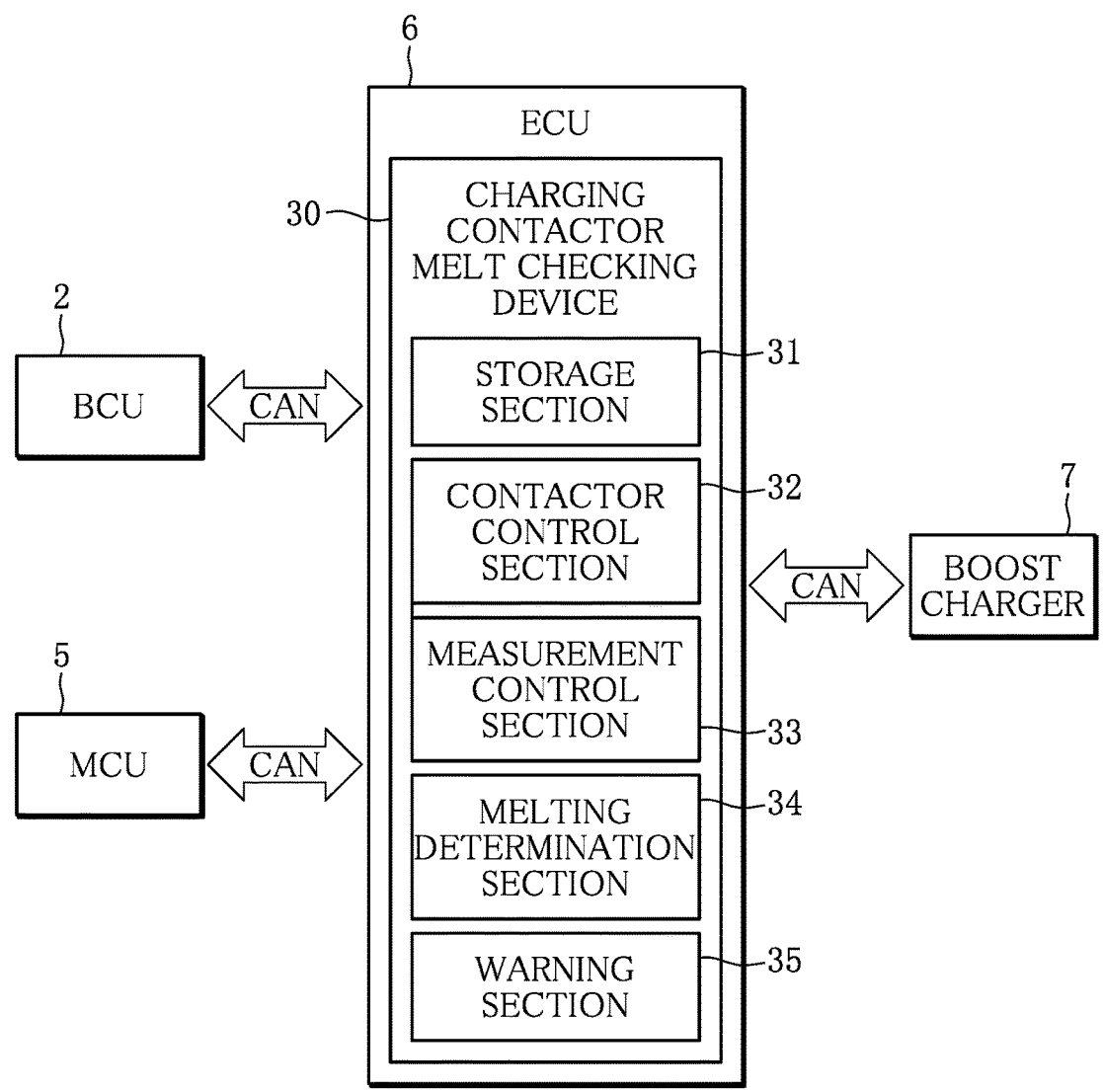
FIG. 3 is a diagram showing an outline of a configuration of a charging control device in accordance with the present invention.

FIG. 3 schematically shows a configuration of a melt checking device 30 for a charging contactor, in accordance with the present invention, the melt checking device 30 being assembled in the electronically controlling unit (ECU) 6 in accordance with the present invention, for checking a charging contactor for melt.

The electronically controlling unit 6 includes a storage section 31, a contactor control section 32, a measurement control section 33, a melting determination section 34, and a warning section 35.

The storage section 31 stores a state of charge and discharge (SOC) of the battery 1 and data on voltage between the terminals, from the BCU 2, and also stores data on a measurement value $V_T$ of voltage between the terminals of the connector 8, from the external charger 7. The ECU 6 transmits a signal indicating that charging is completed to the external charger 7 on the basis of a state of charge and discharge (SOC) of the battery 1, as well as starting charging finishing operation including checking the charging contactor for melt.

The storage section 31 stores a value of voltage $V_D$ for determining unlocking of a connector as well as a variety of data items describe above. The voltage value $V_D$ may be data from the external charger through the CAN. Alternatively, a voltage value determined by specifications or the like of the external charger may be previously stored. The circuit of FIG. 2 may store data on a time constant for predicting voltage between connector terminals with a reduction in the voltage $V_C$ between the terminals of the smoothing capacitor when discharge of the smoothing capacitor is started after charging is completed.

The contactor control section 32 generates a signal controlling opening/closing of the charging contactors 11 and 12 when their melt is checked, and transmits the signal to the BCU 2. The contactor control section 32 also generates control signals of all contactors (the main contactors 9 and 10, and the charging contactors 11 and 12) other than the signal of control, and transmits the control signals to the BCU 2 or the MCU 5.

The measurement control section 33 generates a measurement command signal and transmits it to the external charger 7 so that the voltage between the terminals of the connector 8 is measured in synchronization with control of each contactor by the contactor control section 32.

The melting determination section 34 compares the value of voltage $V_T$ between the terminals of the connector 8 and the value of voltage $V_D$ for determining unlocking of a connector, stored in the storage section 31, to determine whether the charging contactors 11 and 12 melt. That is, the voltage $V_D$ for determining unlocking of a connector is used as a threshold value $V_{TH}$ for determining melt. As described later, a voltage value $V_F$ equal to or less than voltage between the terminals of the battery 1 when charging is completed may be used as the threshold value $V_{TH}$ for determining melt.

The melting determination section 34 also generates a signal of allowing unlocking of the connector 8 when a check for melt is finished on the basis of determination results of melt for the contactors, and transmits the signal to the external charger 7.

As described later in an embodiment 2, when the contactor is checked for melt by using the voltage between connector terminals that decreases with discharge of the smoothing capacitor after charging is completed, a voltage less than the voltage between connector terminals, predicted by using the time constant of discharge of the smoothing capacitor stored in the storage section 31 described above, may be calculated to be set as the threshold value for determining melt.

The warning section 35 displays a warning in a dashboard when checking of the charging contactor for melt described above determines that the contactor has a defect (melt) to allow an operator of the electric vehicle to recognize the determination.

As shown in FIG. 3, the melt checking device 30 for a charging contactor also can be configured as a circuit in the ECU 6, or can be configured as software that operates in a computer device (CPU, not shown) in the ECU 6.
(Principle of Melting Determination in Embodiment 1)

As described above, it is thought that the charging contactors 11 and 12 may melt at the time of charging in many cases. First, melting determination of the contactors 11 and 12 when charging is finished will be described below. The circuit of the embodiment 1 enables melting determination of the charging contactors 11 and 12 in a case other than charging. This matter will be described in the embodiment 2.

Figure 4:
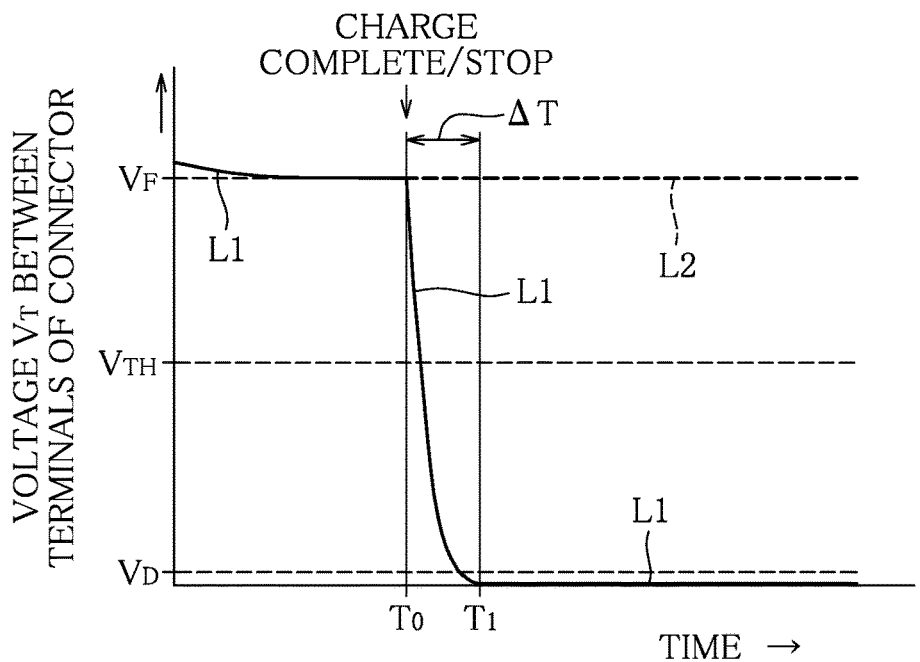
FIG. 4 is a diagram describing operation of the charging control device in accordance with the present invention in the embodiment 1.

FIG. 4 shows change in the voltage $V_T$ between the terminals of the connector 8 when at least one of the charging contactors 11 and 12 does not melt in the circuit of the embodiment 1 shown in FIG. 2, or change in voltage between the charging DC lines LCP2 and LCN2 or between LCP3 and LCN3, by a solid line L1. The external charger 7 is coupled to the charging connector 8 of the electric vehicle 100, and then the voltage $V_T$ between the terminals of the connector 8 becomes a rated voltage $V_F$ corresponding to a SOC of the battery 1 that is charged 100% at a time $T_0$ so that the charging finishing operation is started. Charging operation has been already started prior to a time range shown in FIG. 4, and thus FIG. 4 schematically shows only the last part of the charging operation.

The voltage $V_F$ is voltage between the terminals of the battery 1 at the time when charging is finished, measured by a voltage measurement meter (not shown) provided in the battery 1. Measurement data on the voltage $V_F$ is transmitted to the electronically controlling unit (ECU) 6 from the battery control unit (BCU) 2 through the CAN. Since the main contactors 9 and 10 are closed, the voltage between the terminals of the battery 1 equals to the voltage $V_C$ between the terminals of the smoothing capacitor 13.

In the charging finishing operation, the charging contactor 11 and 12 are controlled to open at the time $T_0$, and the electronically controlling unit 6 transmits a signal indicating that charging is completed to the external charger 7 through the CAN.

When direct current output on the external charger 7 side is stopped, the resistance 19 (R2) immediately discharges electric charges remaining in the charging DC lines LCP2, LCP3, LCN2, and LCN3, and thus the voltage $V_T$ between the terminals of the connector 8 decreases from the voltage $V_F$ between the terminals of the battery 1 at the time $T_0$ when the charging is finished to predetermined voltage $V_D$ or less at a time $T_1$ after elapse of a time $\Delta T$. The predetermined voltage $V_D$ is set at about 5 V, for example, so as to be no problem even if electrical shock is received and to be a determination criterion for unlocking of the connector 8. Thus, the predetermined voltage $V_D$ is the above-described voltage for determining unlocking of a connector (voltage for unlocking a connector), at which or less than which the charging gun 8b can be removed.

To immediately perform the charging finishing operation to enable the charging gun 8b to be immediately removed, the resistance value R2 of the resistance 19 is selected so that a difference $\Delta T$ between the times $T_1$ and $T_0$ becomes 5 seconds or less, for example. If both of the charging contactors 11 and 12 normally operate and open, electric charges of stray capacitance of the charging DC lines LCP2, LCP3, LCN2, and LCN3 is discharged, and thus the R2 can perform sufficiently immediate discharge at such a high resistance value as not to generate a large amount of heat during charging.

(Determination in Embodiment 1 if Both Contactors 11 and 12 Melt)

If both of the positive electrode side contactor 11 and the negative electrode side contactor 12, for charging, melt, voltage $V_T$ between connector terminals changes as shown by a dotted line L2 in FIG. 4. Even if the charging contactors 11 and 12 are controlled to open at the time $T_0$, voltage between the terminals of the battery 1 is still applied to the charging DC lines LCP and LCN if the contactors melt. As a result, the voltage between the connector terminals is still at $V_F$ even after the time $T_0$ as shown in FIG. 5.

Thus, if the voltage $V_T$ between the connector terminals measured by the voltage measurement meter 18, transmitted to the electronically controlling unit 6 from the external charger 7 at the time $T_1$, is sufficiently larger than the voltage $V_D$ for determining unlocking of a connector described above, it is determined that both of the charging contactors 11 and 12 melt. Accordingly, as a threshold voltage $V_{TH}$ of melting determination of the charging contactors 11 and 12, the voltage $V_D$ for determining unlocking of a connector, as well as voltage less than the voltage $V_F$ between the terminals of the battery 1 at the time when charging is completed, may be available.

Figure 5:
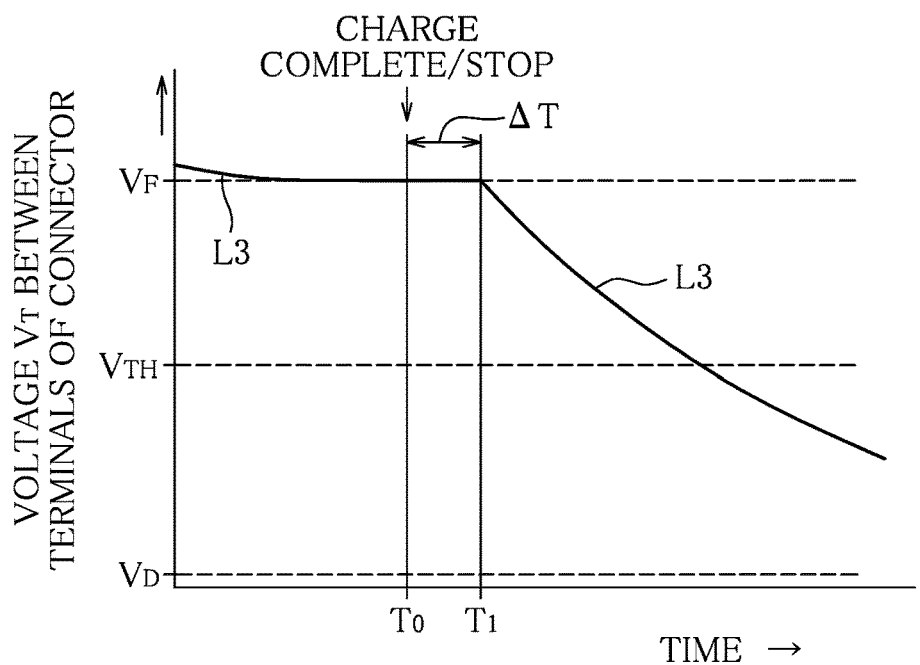
FIG. 5 is a diagram describing the operation of the charging control device in accordance with the present invention in the embodiment 1.

When it is determined at the time $T_1$ that both of the charging contactors 11 and 12 melt, the main contactors 9 and 10 immediately open to reduce the voltage $V_T$ between the terminals of the connector 8, and after that the voltage $V_T$ between the terminals of the connector 8 decreases as shown in FIG. 5. After once the main contactors 9 and 10 open, the main contactors 9 and 10 are controlled not to open again while it is determined that both of the charging contactors 11 and 12 melt.

Although the voltage measurement meter 17 on the electric vehicle 100 side also can measure the voltage $V_T$ between the terminals of the connector 8 in the circuit of FIG. 2, it is also stated here that measurement of the voltage $V_T$ is based on a measurement value of the voltage measurement meter 18 because unlocking of the connector on the external charger 7 side is based on voltage on the external charger 7 side.

(Determination in Embodiment 1 if Contactor 11 or 12 Melts)

If any one of the charging contactors 11 and 12 does not melt, the contactors 11 and 12 are controlled to open at the time $T_0$ to allow the voltage $V_T$ between the terminals of the connector 8 to change as shown in FIG. 4 by the solid line L1. Then the voltage $V_T$ decreases to the voltage $V_D$ for determining unlocking of a connector or less at the time $T_1$ so that the charging gun 8b can be removed. In this state, it is possible to further determine whether any one of the contactors 11 and 12 melts.

Figure 6:
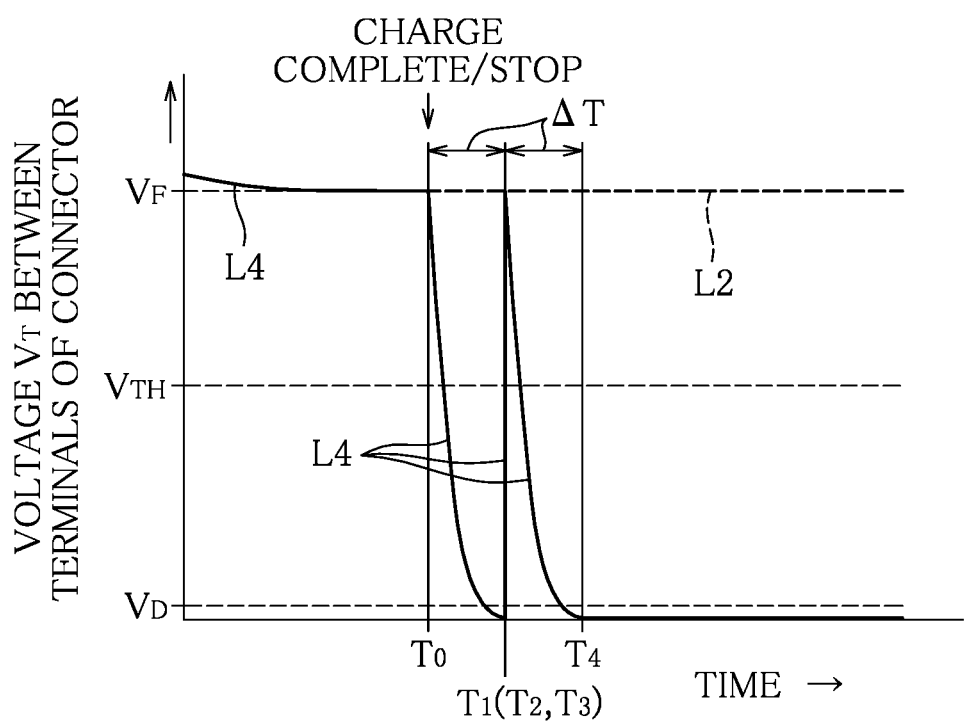
FIG. 6 is a diagram describing the operation of the charging control device in accordance with the present invention in the embodiment 1.

First, only any one of the charging contactors 11 and 12 is controlled to close to measure the voltage $V_T$ between the terminals of the connector 8. Then, any one of the charging contactors 11 and 12 closes at a time $T_2$ subsequent to the time $T_1$. If the charging contactor without melt is controlled to close, the voltage $V_T$ between the connector terminals changes as shown in FIG. 6 by a solid line L4. In this case, the voltage $V_T$ between the terminals of the connector 8 rapidly rises to the voltage $V_F$ between the terminals of the battery 1 at the time $T_2$. Accordingly, the voltage $V_T$ measured at the time $T_2$ is more than the voltage $V_D$ for determining unlocking of a connector or the predetermined threshold value $V_{TH}$, and thus it is possible to determine that the charging contactor that is not controlled to close melts.

If the voltage $V_T$ between the terminals measured at the time $T_2$ is less than the predetermined voltage $V_D$ or $V_{TH}$, the contactor that has been controlled to close at the time $T_2$ is controlled to open at a time $T_3$, and the other contactor is controlled to close, to measure the voltage $V_T$ between the terminals of the connector 8. If the voltage $V_T$ between the terminals is more than the predetermined voltage $V_D$ in this measurement at the time $T_3$, it is determined that the other contactor that should not close melts.

If the voltage $V_T$ between the terminals of the connector 8 is the predetermined voltage $V_D$ or $V_{TH}$, or less in measurements at both of the times $T_2$ and $T_3$ above, namely the voltage $V_T$ changes as shown in FIG. 4 by the solid line L1, it is determined that there is no melt of both of the positive electrode side contactor 11 and the negative electrode side contactor 12, for boost charging.

The voltage between the terminals is measured at the times $T_2$ and $T_3$ under a condition where measurement voltage at the time $T_1$ is the predetermined voltage $V_D$ or $V_{TH}$, or less. The voltage $V_T$ between the terminals of the connector 8 rapidly rises to the voltage $V_F$ between the terminals of the battery 1 that is more than the voltage $V_D$, only if both of the contactors close in any one of measurements at the times T2 and T3. Thus, it is possible to immediately perform switching between opening and closing of the contactors 11 and 12 as well as measurement of the voltage $V_T$ between the terminals of the connector 8, at the times $T_2$ and $T_3$, as described above, subsequent to measurement at the time $T_1$, under a condition where $T_1$, $T_2$, and $T_3$ are almost the same.

After melting determination, the charging contactors 11 and 12 as well as the main contactors 9 and 10 are controlled to open to immediately unlock the connector 8, and thus the voltage $V_T$ between the terminals of the connector 8 decreases to the voltage $V_D$ for determining unlocking of a connector or less at a time $T_4$ after elapse of a predetermined time $\Delta T$ from the time $T_3$. Then, a vehicle is set in a limp home mode to move the vehicle in safety.

The smoothing capacitor 13 also discharges during usual stop operation of an electric vehicle. Since capacity C1 of the smoothing capacitor 13 has a large capacity, specifications of the discharge resistance 14 including the resistance value R1 are set so that the smoothing capacitor 13 discharges in electric current that does not burn out the discharge resistance 14 and finishes discharging in about a few tens of seconds. The resistance value R1 is sufficiently less than the resistance value R2 of the discharge resistance 19 of the external charger, described above. That is, a time constant of voltage drop characteristics is almost determined by the capacity C1 of the smoothing capacitor 13 and the resistance value R1 of the discharge resistance 14.

Since electric charges of the capacitor 13 are actually discharged by the discharge resistance 19 and an internal resistance of each of the voltage measurement meters 17 and 18, along with the discharge resistance 14, voltage drop characteristics of voltage between the terminals of the capacitor 13 are determined in accordance with a time constant that is determined by the capacity C1 of the smoothing capacitor 13, the resistance value R1 of the discharge resistance 14, the resistance value R2 of the discharge resistance 19, and the internal resistance of each of the voltage measurement meters 17 and 18.

(Determination by Using Voltage Measurement Meter on Electric Vehicle Side)

As can be seen from the description above, the voltage $V_T$ between the terminals of the connector 8 used for melting determination of the charging contactors 11 and 12 described above may be measured by using the voltage measurement meter 17 on the electric vehicle 100 side instead of the voltage measurement meter 18 on the external charger 7 side.

If no voltage measurement value is transmitted from an external charger side depending on specifications of the external charger 7, a voltage measurement meter provided on a vehicle side is useful to determine melt.

In addition, if the voltage measurement meter 18 is provided on the electric vehicle 100 side, melt of the charging contactors 11 and 12 can be determined at only the electric vehicle.

(Flow of Check Operation for Melt in Embodiment 1)

FIGS. 7A and 7B show a flow of melting determination and control operation of the contactors (the main contactors 9 and 10, and the charging contactors 11 and 12) described in FIGS. 2 to 6, performed by the charging control device. The electronically controlling unit 6 of the charging contactor in accordance with the present invention determines melt. To determine melt, the electronically controlling unit 6 also transmits a command of opening/closing of the contactor, and a command of voltage measurement, to the battery control unit (BCU) 2, the motor control unit (MCU) 5, and the external charger 7, through the CAN, to allow opening/closing of the contactor and voltage measurement to be performed. Steps S0 to S13 in FIGS. 7A and 7B show respective steps of operation of the charging control device, and correspond to operation at the times $T_0$ to $T_3$, described in FIGS. 4 to 6. While the ECU 6 and the external charger 7 perform each operation almost at the times $T_0$ to $T_3$ shown in the drawings, operation described by the same time may not be performed at the exactly same time. As described above, since operation at each of the times $T_1$ to $T_3$ is continuously performed, the times $T_1$ to $T_3$ are almost the same.

(Step S0)

The electronically controlling unit (ECU) 6 starts the charging finishing operation in step S0 if it is determined that the battery 1 is in a state of charge (SOC) of 100% on the basis of data showing a state of the battery transmitted from the battery control unit (ECU) 2 (time $T_0$). Then, the ECU 6 transmits a signal indicating that charging is finished to the external charger 7 side through the CAN, and the external charger 7 stops the direct current output.

(Step S1)

When starting the charging finishing operation, the ECU 6 simultaneously transmits a command of allowing the charging contactors 11 and 12 to open to the BCU 2 and the MCU 5.

(Step S2)

When the voltage $V_T$ between the terminals of the connector 8 measured at the time $T_1$ is transmitted to the ECU 6 from the external charger 7, the ECU 6 determines whether the voltage is the predetermined voltage $V_D$ for determining unlocking of a connector or less. If the $V_T$ is equal to or less than the $V_D$, it is determined that the voltage between the terminals of the connector 8 normally decreases, and the processing proceeds to step S4.

(Step S3)

If the $V_T$ is more than the $V_D$ in step S2, it is determined that both of the charging contactors 11 and 12 melt.

In this case, the voltage between the terminals of the connector 8 is high because output voltage of the battery is applied to the connector 8, and thus the charging gun 8b cannot be removed in this state. Then, the ECU 6 transmits a command of allowing the main contactors 9 and 10 to open to the MCU 5. The ECU 6 also transmits a signal of allowing gun removal to the external charger 7. As described above, this state causes the voltage $V_T$ between the terminals of the connector 8 to be equal to or more than the voltage $V_D$ for determining unlocking of a connector until discharge of the smoothing capacitor 13 is completed after the main contactors 9 and 10 open. As a result, the external charger 7 does not unlock the connector.

In operation (A) on the vehicle side subsequent to step S3, the ECU 6 does not allow shifting to a normal traveling mode (ready-on) of the vehicle. That is, a vehicle power source is prevented from being turned on again, or the main contactors 9 and 10 are prohibited from being turned on, to increase safety on a user side. Then, display in a dashboard or an operation panel or warning by an alarm allows an operator of an electric vehicle to recognize this state. Accordingly, the operator (a driver of the electric vehicle, or an operator of the external charger) recognizes that there is melt, and thus can immediately perform an appropriate measure (such as gun removal, covering a high voltage exposure place, or repairing melt failure). For example, when a cover (a charging cap, or a charging lid), with which the connector socket 8a on the electric vehicle side is covered, is closed after the connector plug 8b is removed, a cover locking unit locks the cover to prohibit the cover from being opened again.

(Step S4)

Since the voltage $V_T$ between the terminals of the connector 8 normally decreases, it is determined that at least one of the charging contactors 11 and 12 does not melt. However, it is impossible to determine whether both of the contactors melt at the steps up to this point.

In this state, the connector 8 is usually unlocked on the external charger 7 side because it is determined that the voltage $V_T$ between the terminals normally decreases. However, if the present invention is used, it is determined whether the contactor is further checked for melt on the electric vehicle side (a vehicle driver determines, for example). To prevent the connector from being unlocked until the ECU 6 transmits a signal of allowing removal of the connector plug (gun) 8b to the external charger side, the ECU 6 previously transmits a command to the external charger 7 side before the signal of allowing removal of the gun is transmitted.

In step S4, it is determined whether the contactor is further checked (a driver of the electric vehicle determines). It is also possible to set checking operation after step S4 to be always performed or not to be performed. In this case, the ECU 6 proceeds to further check on the basis of a condition set.

(Step S5)

In step S4, if it is determined not to further check for melt, the check for melt is finished. Then, the main contactors 9 and 10 are controlled to open, and the signal of allowing removal of the gun is transmitted to the external charger 7 side.

If the check for melt is sopped here, it is not determined whether any one of the charging contactors 11 and 12 melts. If any one of the contactors melts, output voltage of the battery may be applied to any of the terminals of the connector socket 8a depending on an operation condition of a vehicle after charging is finished. In vehicle side operation (B) subsequent to this operation, it is desirable to determine melt by using the voltage measurement meter provided on the electric vehicle side as described above.

(Step S6)

The ECU 6 transmits a signal of allowing any one of the positive electrode side charging contactor and the negative electrode side charging contactor to close to the battery control unit 2. The battery control unit 2 controls any one of the positive electrode side charging contactor and the negative electrode side charging contactor to close on the basis of the signal. The battery control unit 2 also simultaneously transmits a command signal of measuring the voltage between the terminals of the connector 8 to the external charger 7 side.

(Step S7)

If the measurement voltage $V_T$ transmitted from the external charger 7 is more than the $V_D$, it is determined that the contactor, to which no closing command is applied, melts (Step S8). If the $V_T$ is equal to or less than the $V_D$, the processing proceeds to step S9.

(Step S9)

A command allowing the contactor, to which a closing command is applied in step S6, to open, as well as a command allowing the other contactor to close, is transmitted to the BCU 2 so that opening/closing of the charging contactors 11 and 12 is controlled. The command signal of measuring the voltage between the terminals of the connector 8 is also simultaneously transmitted to the external charger 7 side.

(Step S10)

If the measurement voltage $V_T$ transmitted from the external charger 7 is more than the $V_D$, it is determined that the contactor, to which no closing command is applied, melts (step S8). If the $V_T$ is equal to or less than the $V_D$, it is determined that both of the charging contactors 11 and 12 do not melt (Step S11).

(Step S11)

It is determined that both of the charging contactors 11 and 12 do not melt, and then the signal of allowing removal of the gun is transmitted to the external charger 7.

In operation of the vehicle (D) subsequent to this operation, usual normal operation is performed.

(Step S8)

It is determined that the contactor, to which no closing command is applied, melts on the basis of a comparison between the measurement voltage $V_T$ in step S7 or S10, and the predetermined voltage $V_D$.

In this case, the electric vehicle is set in the limp home mode, and the ECU 6 allows this state to be displayed in a dashboard or an operation panel, or to be warned by an alarm, in operation (C) on the vehicle side subsequent to step S8 so that an operator of the electric vehicle can recognize this state. Then, the operator recognizes that there is melt, and thus can immediately perform an appropriate measure.

Even in this case, since any one of the charging contactors 11 and 12 melts, the terminals to which voltage is applied may be exposed when the connector plug 8b is removed. Thus, as with the operation (A) described above, a safety measure, such as preventing the vehicle power source from being turned on again, or locking the cover of the connector socket 8a, may be performed.

(Step S12)

The ECU 6 transmits a command allowing the positive electrode side charging contactor 11 and the negative electrode side charging contactor 12 to open to the BCU 2. The ECU 6 also simultaneously transmits the signal of allowing removal of the gun to the external charger 7. When both of the charging contactors 11 and 12 open, as described above, electric charges in the charging DC lines LCP and LCN are immediately discharged, and thus the voltage between the terminals of the connector 8 decreases to the predetermined voltage $V_D$ or less.

Although the BCU 2 controls the charging contactors 11 and 12 to open and close on the basis of a command from the ECU 6 in the descriptions of FIGS. 7A and 7B above, the MCU 5 may control the contactors to open and close as described before. In addition, the ECU 6 may directly control the contactors.

Variation 1 of Embodiment 1

In the circuit described in FIG. 2, a contactor itself having a function of determining melt (refer to Japanese Patent Laid-Open No. 2010-183795, for example) is available. In this case, the voltage between the terminals of the connector 8 is not required to determine melt, and thus the melting determination described in FIGS. 7A and 7B is greatly simplified.

Even if this kind of contactor is used, the measures (A and C) of the vehicle side, described in FIGS. 7A and 7B, are performed if it is determined that the contactor melts.

Variation 2 of Embodiment 1

Figure 8:
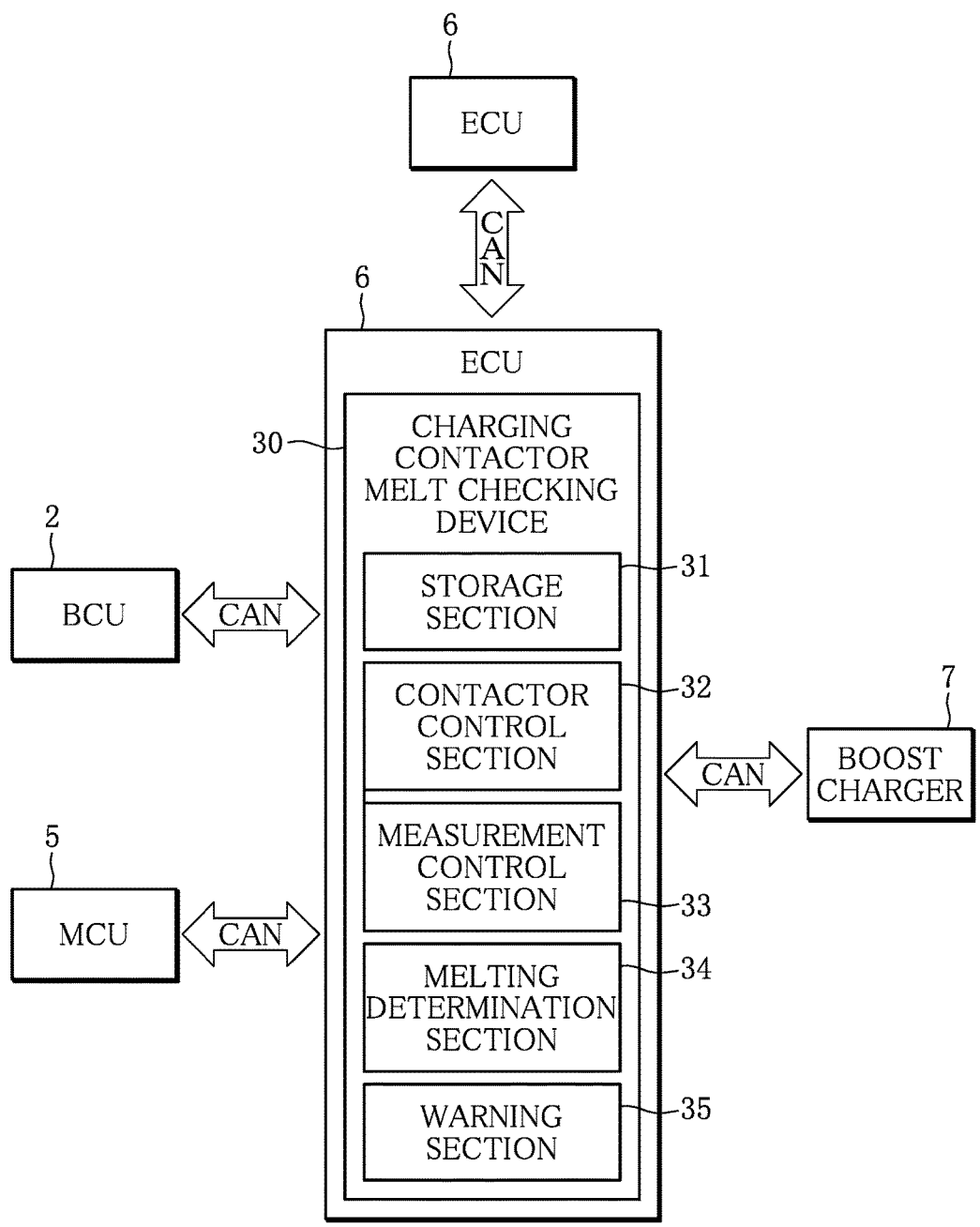
FIG. 8 is a diagram showing an outline of a configuration of a variation of the embodiment 1 of the charging control device in accordance with the present invention.

As shown in FIG. 8, a charging contactor melt checking device 30 is an independent device, or can be assembled into a control device separate from the ECU 6. In this case, various kinds of data, and a control signal, may be transmitted and received through the CAN and the ECU 6, or may be directly transmitted and received among the BCU 2, the MCU 5, and the external charger, through the CAN.

Embodiment 2

Using the circuit configuration including the charging control device in accordance with the present invention, shown in FIG. 2 and described in the embodiment 1, enables melting determination of the charging contactors 11 and 12 when an electric vehicle is stopped. A principle and operation of the determination will be described below. Although an embodiment 2 is described with reference to FIGS. 9 to 12, characters shown in FIGS. 9 to 12 indicate contents different from those indicated by the characters shown in FIGS. 4 to 7.

(Principle of Melting Determination in Embodiment 2)

Figure 9:
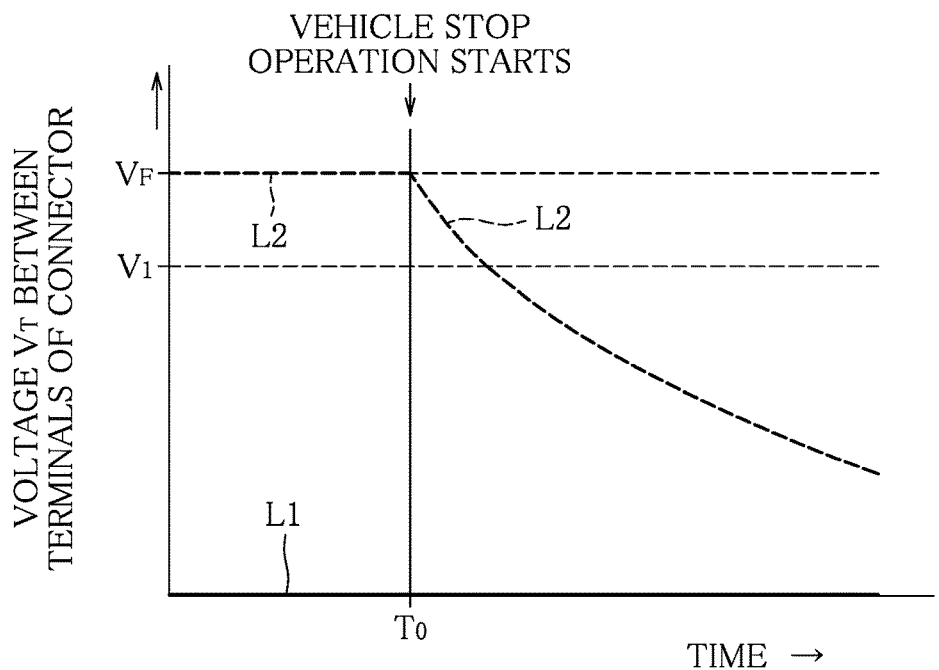
FIG. 9 is a diagram describing operation of the charging control device in accordance with the present invention in an embodiment 2.

The solid line L1 in FIG. 9 shows the voltage $V_T$ between the terminals of the connector 8, or voltage between the charging DC lines LCP2 and LCN2, measured by the voltage measurement meter 17 when at least one of the charging contactors 11 and 12 does not melt in the circuit of the embodiment 1 shown in FIG. 2.

During normal operation of the vehicle, the charging contactors 11 and 12 are controlled to open, the voltage between the charging DC lines LCP2 and LCN2 is 0 V, as shown by the solid line L1. The main contactors 9 and 10 are controlled to close.

When the electric vehicle is stopped, the main contactors 9 and 10 are controlled to open, as well as the discharge switch 15 being closed so that electric charges of the smoothing capacitor 13 are discharged, at a time $T_0$.

If both of the charging contactors 11 and 12 melt, the voltage $V_T$ between the connector terminals becomes equal to voltage between the driving DC lines LSP and LSN, and the voltage changes as shown by a dotted line L2.

The voltage $V_F$ here is voltage between the terminals of the battery 1 at the time when the vehicle is stopped, measured by a voltage measurement meter (not shown) provided in the battery 1. Measurement data on the voltage $V_F$ is transmitted to the electronically controlling unit (ECU) 6 from the battery control unit (BCU) 2 through the CAN.

(Determination in Embodiment 2 when Both Contactors 11 and 12 Melt)

Figure 10:
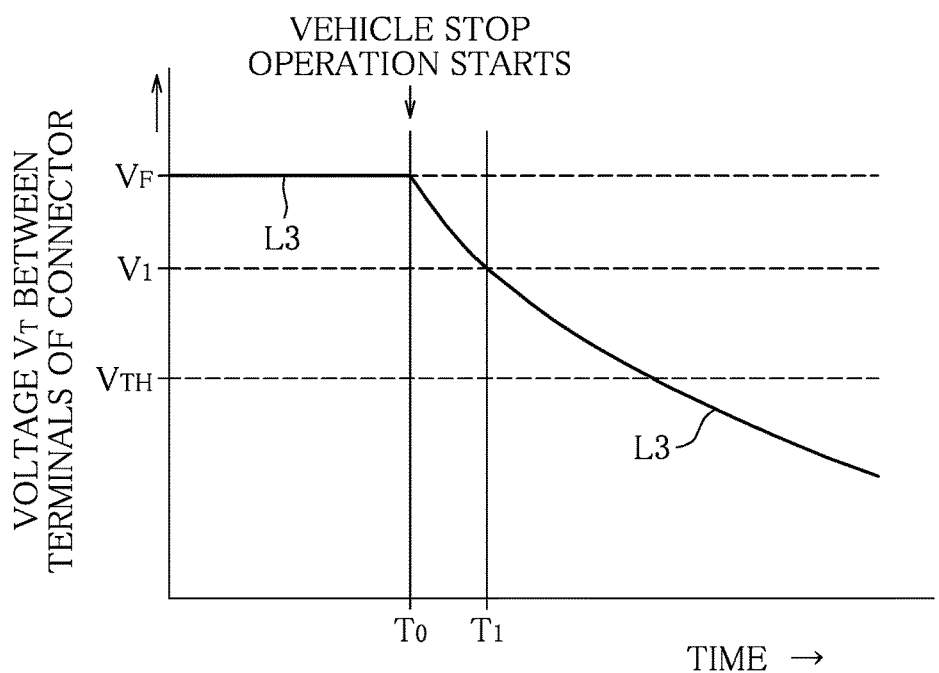
FIG. 10 is a diagram describing the operation of the charging control device in accordance with the present invention in the embodiment 2.

If both of the positive electrode side contactor 11 and the negative electrode side contactor 12, for charging, melt, the voltage $V_T$ between connector terminals changes as shown by a solid line L3 in FIG. 10. That is, the voltage changes as shown by the dotted line L2 in FIG. 9. As described before, a time constant of voltage drop characteristics after the time $T_3$ of the dotted line L2 in FIG. 9 and the solid line L3 in FIG. 10 is almost determined by the resistance value R1 of the discharge resistance 14 and the capacity C1 of the smoothing capacitor 13. Accordingly, it is possible to predict change in voltage values shown by the L2 and the L3.

Thus, if the voltage $V_T$ between the connector terminals measured by the voltage measurement meter 17 at the time $T_1$, for example, is on the order of voltage predicted by using the voltage drop characteristics of the L2 or the L3 ($V_1$ in FIG. 10), it is determined that both of the charging contactors 11 and 12 melt. Alternatively, voltage sufficiently less than the $V_1$ is used as a threshold voltage $V_{TH}$ for melting determination of the charging contactors 11 and 12, and if a measurement value $V_1$ of the voltage $V_T$ between the connector terminals is more than the threshold voltage $V_{TH}$, it is determined that both of the contactors 11 and 12 melt.

(Determination in Embodiment 2 when Contactor 11 or 12 Melts)

If any one of the charging contactors 11 and 12 does not melt, the voltage $V_T$ between the terminals of the connector 8 changes as shown by the solid line L1 in FIG. 9. To determine whether any one of the charging contactors 11 and 12 melt, subsequently any one of the contactors 11 and 12 is controlled to close at a time $T_2$. If the contactor that closes does not melt, the control causes both of the contactors 11 and 12 to close, and then voltage of the driving side DC lines LSP and LSN is applied to the charging DC lines LCP2 and LCN2 so that the voltage $V_T$ changes as shown by a solid line L4 in FIG. 11. At the time $T_2$, the voltage $V_T$ between the terminals of the connector 8 rapidly rises to the voltage $V_1$ in FIG. 10. If the voltage value $V_1$ is more than the threshold voltage $V_{TH}$, it is determined that the contactor that is not controlled to close melts.

If the contactor that is controlled to close has already melted, the other contactor opens, and thus the voltage $V_T$ between the terminals of the connector 8 measured at the time $T_2$ is still 0 V. In this case, at a time $T_3$, subsequently the contactor that has been controlled to close is controlled to open as well as the contactor that has not been controlled to close being controlled to close, and then the voltage $V_T$ between the terminals of the connector 8 is measured. If a measurement voltage at the time $T_3$ becomes $V_1$ that is more than the threshold voltage $V_{TH}$, it is determined that the contactor that has not been controlled to close melts.

If the voltage $V_T$ between the terminals of the connector 8 measured at both of the times $T_2$ and $T_3$ above is less than the predetermined threshold voltage $V_{TH}$, it is determined that both of the positive electrode side contactor 11 and the negative electrode side contactor 12, for charging, do not melt. The voltage between the terminals at the times $T_2$ and $T_3$ is measured when melting determination by using voltage measured at each of the times $T_1$ and $T_2$ is not finished, or when the voltage measured at the times $T_1$ and $T_2$ is less than the predetermined threshold voltage $V_{TH}$. The voltage $V_T$ between the terminals of the connector 8 rapidly rises to the value $V_1$ more than 0 V and then decreases in accordance with a time constant as described above, only if both of the contactors close in any one of measurements at the times $T_2$ and $T_3$. Thus, it is possible to continuously and immediately perform switching between opening and closing of the contactors 11 and 12 as well as measurement of the voltage $V_T$ between the terminals of the connector 8, at the times $T_2$ and $T_3$, as described above, under a condition where $T_1$, $T_2$, and $T_3$ are almost the same.

After the melting determination above (after the time $T_3$ almost equal to $T_1$), the charging contactors 11 and 12 are actually controlled to open (or automatic open by normally-off). Thus, if one of the contactors does not melt, electric charges in the charging DC lines LCP2 and LCN2 are discharged by an internal resistance of the voltage measurement meter 17, and then the voltage $V_T$ changes as shown by a dotted line L5 in FIG. 11.

(Flow of Check Operation for Melt in Embodiment 2)

Figure 11:
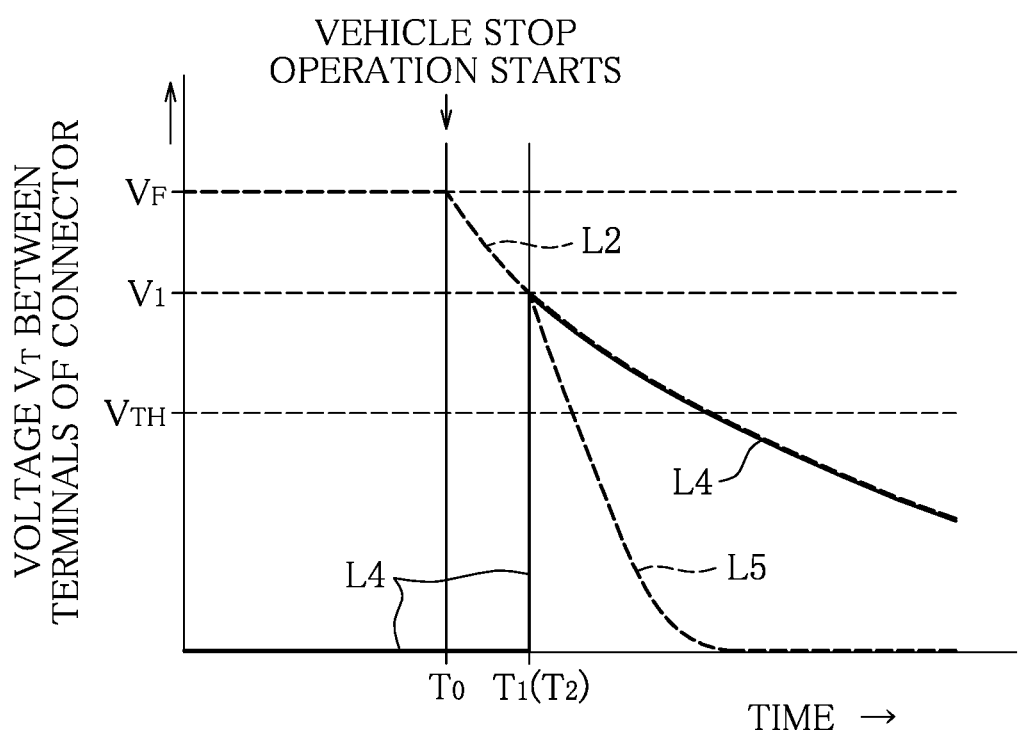
FIG. 11 is a diagram describing the operation of the charging control device in accordance with the present invention in the embodiment 2.
Figure 12:
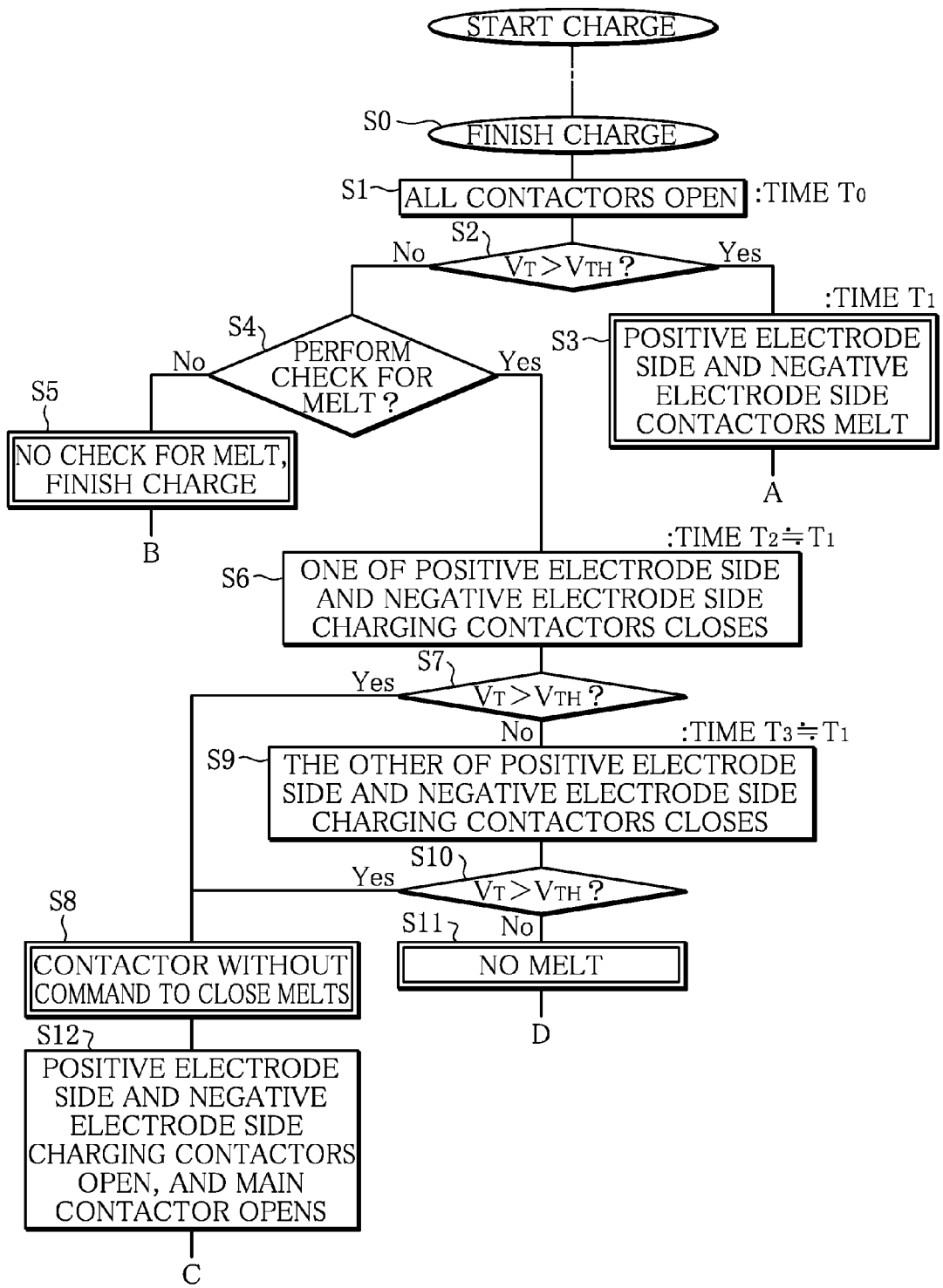
FIG. 12 is a diagram showing an outline of an operation flow of the charging control device in accordance with the present invention in the embodiment 2.

FIG. 12 shows a flow of melting determination and control operation of the contactors (the main contactors 9 and 10, and the charging contactors 11 and 12) described in FIGS. 9 to 11, performed by the charging control device.

The operation flow of the embodiment 2 shown in FIG. 12 can be operated only on the electric vehicle side, and thus is formed by eliminating a part of the external charger side from the flow of FIGS. 7A and 7B. In addition, commands transmitted to the BCU 2 and the MCU 5 from the ECU 6 are the same as those in the flow of FIGS. 7A and 7B, and thus are also omitted.

Since the flow of FIG. 12 is very similar to the operation flow of the embodiment 1 shown in FIGS. 7A and 7B, a detailed description of the flow of FIG. 12 is omitted. In step B of FIG. 12, information on whether melting determination of the charging contactors is performed at the last stop of the vehicle is displayed in a dashboard when the electric vehicle is started.

The foregoing description reveals that the charging control device of the embodiment 2 in accordance with the present invention is available even if a charger is coupled to an electric vehicle.

As described above, the present invention enables a charging connector to be released reliably and immediately. In addition, an operator (a vehicle driver, or an external charger operator) can immediately perform a measure on the basis of a check result when a contactor melts (such as gun removal, covering a high voltage exposure place, or repairing melt failure).

The present invention is not limited to the embodiments above. Unless a feature of the present invention is lost, various variations are available. The charging control device in accordance with the present invention is also available for release of a connector with a similar function, such as a connector that is used in a device for outputting high voltage of a battery mounted in an electric vehicle to the outside. In addition, a charging control method used in the present invention is available for another charge and discharge system or another electric vehicle, using this kind of contactor.

What is claimed is:

1. A charging control device comprising:
    a battery for driving an electric vehicle;
    a driving DC line on each of a positive electrode side and a negative electrode side, through which electric power of the battery is supplied to an inverter;
    a main contactor on each of the positive electrode side and the negative electrode side that is provided in the driving DC line between the battery and the inverter to disconnect or connect the driving DC line;
    a charging connector that is connected to a power supply connector through which electric power is supplied to the battery from an external power source;
    a charging DC line on each of the positive electrode side and the negative electrode side that branches from the driving DC line on each of the positive electrode side and the negative electrode side, between the main contactor and the inverter, and that is connected to the charging connector;
    a charging contactor on each of the positive electrode side and the negative electrode side that is provided in the corresponding charging DC line on each of the positive electrode side and the negative electrode side to disconnect or connect the charging DC line;
    a control unit that controls the main contactor and the charging contactor;
    a voltage-between-terminals measurement unit that measures voltage between the charging DC lines on the positive electrode side and the negative electrode side, or voltage between terminals of the charging connector;
    a connector locking unit that locks connection between the charging connector and the power supply connector if the voltage between the terminals is more than a threshold voltage; and
    a melting determination section that determines whether the charging contactor melts on the basis of whether the voltage between the terminals is more than the threshold voltage,
    wherein the control unit disconnects the main contactor if the melting determination section determines that the charging contactor melts.

2. The charging control device according to claim 1, wherein the control unit prohibits the main contactor from being connected again after the main contactor is disconnected, while it is determined that the charging contactor melts.

3. The charging control device according to claim 1, wherein the melting determination section performs the determination after charging of the battery from the external power source is finished.

4. The charging control device according to claim 2, wherein the melting determination section performs the determination after charging of the battery from the external power source is finished.

5. The charging control device according to claim 1, wherein the melting determination section performs the determination when the control unit outputs a command to disconnect the charging contactor on each of the positive electrode side and the negative electrode side.

6. The charging control device according to claim 2, wherein the melting determination section performs the determination when the control unit outputs a command to disconnect the charging contactor on each of the positive electrode side and the negative electrode side.

7. The charging control device according to claim 3, wherein the melting determination section performs the determination when the control unit outputs a command to disconnect the charging contactor on each of the positive electrode side and the negative electrode side.

8. The charging control device according to claim 4, wherein the melting determination section performs the determination when the control unit outputs a command to disconnect the charging contactor on each of the positive electrode side and the negative electrode side.

9. The charging control device according to claim 5, wherein the melting determination section determines that both of the charging contactors on the positive electrode side and the negative electrode side melt, if the voltage between the terminals is the threshold voltage or more.

10. The charging control device according to claim 6, wherein the melting determination section determines that both of the charging contactors on the positive electrode side and the negative electrode side melt, if the voltage between the terminals is the threshold voltage or more.

11. The charging control device according to claim 7, wherein the melting determination section determines that both of the charging contactors on the positive electrode side and the negative electrode side melt, if the voltage between the terminals is the threshold voltage or more.

12. The charging control device according to claim 8, wherein the melting determination section determines that both of the charging contactors on the positive electrode side and the negative electrode side melt, if the voltage between the terminals is the threshold voltage or more.

13. The charging control device according to claim 1, wherein when the control unit outputs a command to connect only one of the charging contactors of the positive electrode side and the negative electrode side, the melting determination section determines that the other of the charging contactors on the positive electrode side and the negative electrode side melts, if the voltage between the terminals is the threshold voltage or more.

14. The charging control device according to claim 2, wherein when the control unit outputs a command to connect only one of the charging contactors of the positive electrode side and the negative electrode side, the melting determination section determines that the other of the charging contactors on the positive electrode side and the negative electrode side melts, if the voltage between the terminals is the threshold voltage or more.

15. The charging control device according to claim 3, wherein when the control unit outputs a command to connect only one of the charging contactors of the positive electrode side and the negative electrode side, the melting determination section determines that the other of the charging contactors on the positive electrode side and the negative electrode side melts, if the voltage between the terminals is the threshold voltage or more.

16. The charging control device according to claim 4, wherein when the control unit outputs a command to connect only one of the charging contactors of the positive electrode side and the negative electrode side, the melting determination section determines that the other of the charging contactors on the positive electrode side and the negative electrode side melts, if the voltage between the terminals is the threshold voltage or more.

17. The charging control device according to claim 1, further comprising:
a cover with which the charging connector is covered, the cover being openable; and
a cover locking unit that regulates opening of the cover, wherein the cover locking unit prohibits the cover from opening again after the cover is closed when the main contactor is disconnected, while it is determined that the charging contactor melts.

18. The charging control device according to claim 2, further comprising:
a cover with which the charging connector is covered, the cover being openable; and
a cover locking unit that regulates opening of the cover, wherein the cover locking unit prohibits the cover from opening again after the cover is closed when the main contactor is disconnected, while it is determined that the charging contactor melts.

19. The charging control device according to claim 3, further comprising:
a cover with which the charging connector is covered, the cover being openable; and
a cover locking unit that regulates opening of the cover, wherein the cover locking unit prohibits the cover from opening again after the cover is closed when the main contactor is disconnected, while it is determined that the charging contactor melts.

20. The charging control device according to claim 4, further comprising:
a cover with which the charging connector is covered, the cover being openable; and
a cover locking unit that regulates opening of the cover, wherein the cover locking unit prohibits the cover from opening again after the cover is closed when the main contactor is disconnected, while it is determined that the charging contactor melts.

* * * * *